June 9, 1931.  H. J. B. SCHARNBERG  1,808,973
HYDRAULIC PISTON PACKING
Filed Aug. 7, 1928
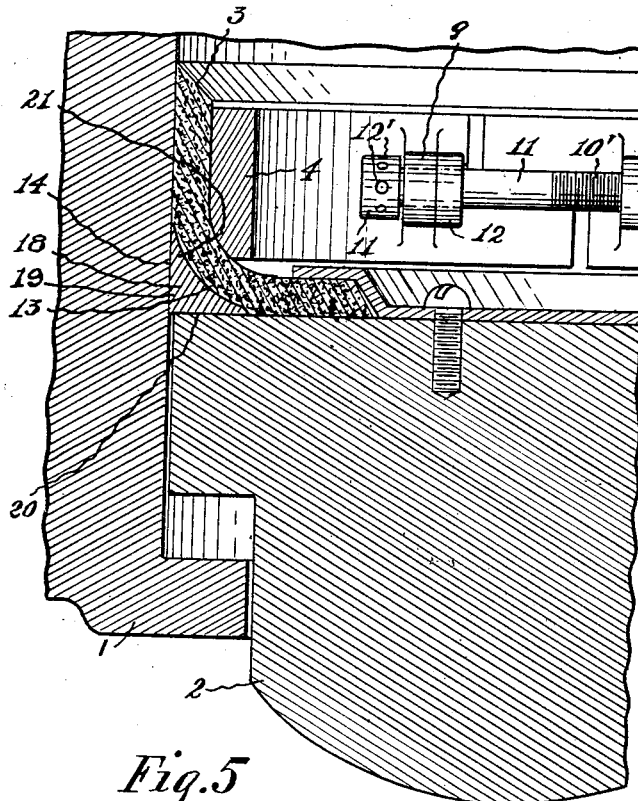
Fig.1
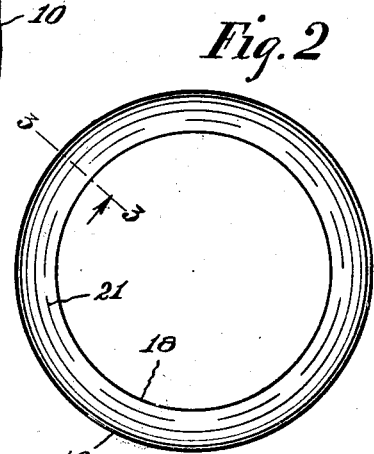
Fig.2
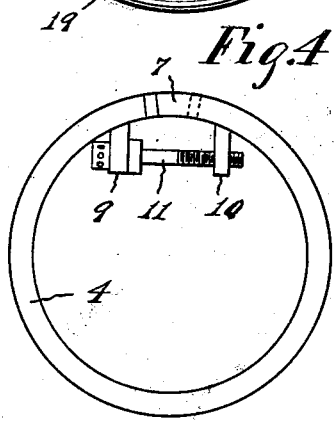
Fig.4
Fig.5
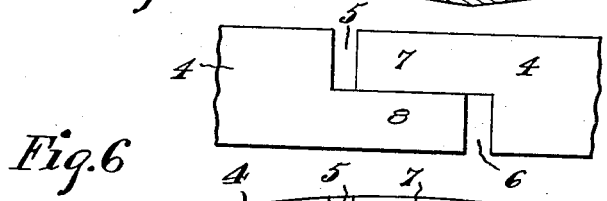
Fig.6
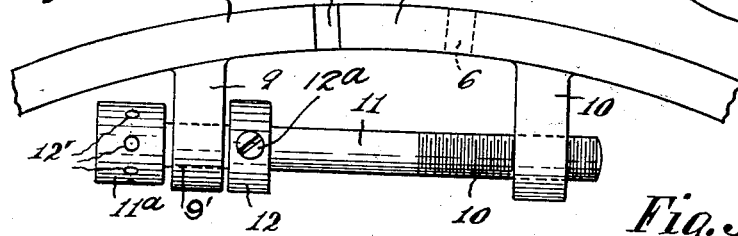
Fig.7
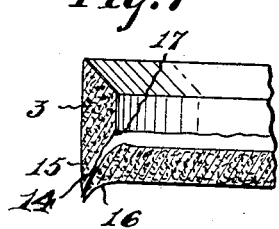
Fig.3
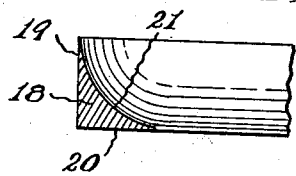
INVENTOR
Herman J. B. Scharnberg,
BY
Harold D. Penney
ATTORNEY Patented June 9, 1931

1,808,973

UNITED STATES PATENT OFFICE

HERMAN J. B. SCHARNBERG, OF FORT WADSWORTH, NEW YORK

HYDRAULIC PISTON PACKING

Application filed August 7, 1928. Serial No. 298,111.

My present invention relates to an improvement in hydraulic presses, and more specifically to the piston packing thereof.

The important feature herein lies in the provision of means whereby the piston packing, of the customary cup-leather type, is so mounted within the cylinder of a hydraulic press, as to prevent blow-outs, to reinforce it against excessive wear, to increase the life of such packing and to increase its efficiency.

A further advantage is to provide means whereby when a cup-leather is first introduced into a hydraulic cylinder, the cup-leather may be initially mounted upon the ram of the press and to the cylinder, in a perfect fluid-tight fit, thereby to prevent breakdown of the packing through careless initial installation.

These and other capabilities will be noted as the description proceeds, and it is to be understood that modifications may be made in the structure without departing from the spirit thereof or the scope of the appended claims.

In the drawings:

Fig. 1 is a fragmentary sectional view of a characteristic type of hydraulic ram showing the invention in fragmentary assembly.

Fig. 2 is a reduced plan view of the packing, sealing or fillet ring of which

Fig. 3 is a partial sectional view thereof, taken on the line 3—3, Fig. 2.

Fig. 4 is a reduced view of the packing expander ring in plan.

Fig. 5 is an enlarged side view of the expander ring joint.

Fig. 6 is an enlarged view of the expander ring expanding means in plan.

Fig. 7 is a fragmentary sectional view of a disrupted cup-leather.

It is customary in hydraulic presses to provide the piston or ram with a flexible piston packing, usually in cup form and made of treated leather. This leather lies against the cylinder wall and prevents leakage of fluid past the ram or piston. In the event of extremely high pressures the cup-leather tends to break down or disrupt at the angle or fillet of the leather cup formation. Further, in initially installing cup-leathers in such a press, the cup forming portions do not always lie snugly against the cylinder wall, thereby insuring a good operative fit, with the result that pressure is lost through the seepage of fluid past the ram, between it and the walls of the cylinder and the clearances thereof.

My improvements correct both of these faults, thereby eliminating excessive repair cost, lengthening the life of the cup-leathers and preventing loss by stoppage of operations through having to take down the press for replacements. This is especially true where the hydraulic rams form part of a sugar mill, where numbers of cane pressing rolls are pressure controlled by hydraulic rams, and where a breakdown of the cup-leathers causes a stopping of a mill during the rush of the pressing season.

In Fig. 1 a fragmentary sectional view of a characteristic hydraulic ram is shown, wherein 1 is the cylinder, 2 is the ram and 3 is the usual cup-leather for providing a fluid-tight packing fit between the cylinder and the ram. The cup-leather 3 may be of the usual form, pre-formed or pressed in cup form, by the usual methods, to fit the diameter of the cylinder bore properly.

To provide against careless installation of the cup-leather within the cylinder, and to initially insure the close fitting of the cup packing all around the cylinder bore, I provide a cup-leather expanding ring 4, Figs. 1 and 4, said ring being of proper diameter to engage the inner face of the cup-leather 3, as in Fig. 1, and having means for expanding said ring to compel the cup-leather to be firmly engaged, circumferentially, with the cylinder wall in a fluid tight manner while affixed to the ram in operative position.

To accomplish this, the annular expander 4, Figs. 4, 5 and 6, is notched cut as at 5 and 6, Fig. 5, so as to form laps 7 and 8, in the usual piston ring construction. At either side of the lap portions 7—8 is extending one of a pair of lugs 9 and 10, which extend inwardly from the inner face of the ring 4 and are integral therewith. The lug 10 is drilled and tapped, respectively, to mount therein a shouldered, threaded ring-expanding or contracting stud 11, one end of which, 10', is threaded to engage the tapped lug 10, and the other end of which is provided with a plain, cylindrical portion 9' which fits in the bore of the lug 9, and is provided with spaced collars 11ᵃ and 12 which are engageable on opposite faces of the lug 9.

The collar 12 may be detachably secured to said stud 11 by means of a suitable set screw 12ᵃ or in any other suitable manner. These collars act as expanding or contracting members, when the stud is rotated, in conjunction with the threaded portions 10—10', to permit of manually expanding or contracting the ring as desired. The collar 11ᵃ is preferably provided with a series of holes 12' to permit of rotation of the stud 11 by a pin wrench or spanner, not shown.

Thus, when ring 4 is positioned as in Fig. 1, the cup-leather may be forced outward, circumferentially to a snug fit all around the cylinder wall, for the desired fluid tight engagement, by the expansion of the ring 4. As a means to prevent rupture of the cup-leather at its weak point, the fillet 13, Fig. 1, such characteristic rupture being shown at 14, Fig. 7, where high pressure has caused a breakdown of the fillet, and the fibres as at 15, 16, leaving a leaking fissure 17 at this point, I provide a fillet ring 18, Figs. 1, 2 and 3, of annular form, the inner surface of which, as at 21, conforms to the natural fillet or bend of the cup-leather, to form a seat or support therefor, the outer wall 19 of the fillet ring being vertical and having a good fit with the cylinder wall, and the lower edge 20 of said ring being flat, to rest upon the top of the ram 2. This is fully disclosed in Fig. 1, and in the enlarged fragmentary section in Fig. 3, wherein the fillet seat 21 is fully shown. It is highly preferable that this fillet ring be of some ductile metal, such as annealed copper or brass. Other metals having these characteristics will be suitable. The use of a ductile metal for the fillet ring is to permit the flowable conformation and expansion thereof, to the cylinder wall after its installation, to insure a good leak-proof fit.

In the initial installation of this ring it is of such dimensions as to permit its easy introduction into the cylinder, the fillet ring being only a few thousandths of an inch smaller, and after the cup-leather is mounted, as in Fig. 1, and operation of the hydraulic press is started, the heavy hydraulic forces exerted upon the cup-leather and fillet ring 18, cause the ring 18 to slowly expand to a close, intimate contact with the cylinder walls, which permits its automatic adjustment for wear, and perfectly supports the weak point 13 of the cup-leather against ruptures of the type disclosed in Fig. 7. The elimination of this fault has great economic advantages.

Thus, it will be noted that I have provided an improved, flexible easily installable self-accommodating and adjusting hydraulic packing of a flexible, ductile nature, composed of leather and metal, without loss of any advantages accruing from the use of leather as a hydraulic packing, and with the advantageous elimination of previous faults by the metallic reinforcement thereof.

Variations are possible, and parts of my invention may be used without other parts.

Having thus described my invention what I claim is:

1. A hydraulic press piston of the class described comprising a hydraulic cup leather and an expandible continuous metal fillet supporting ring for supporting the fillet of said cup leather.

2. A hydraulic packing of the class described comprising a cup leather, manually adjustable means on said cup leather for adjustably expanding the same, and an expandible continuous fillet ring for supporting the fillet of said cup leather.

3. A cup leather for hydraulic piston packing comprising, in combination with a ram of a hydraulic press and the cylinder thereof, of a cup leather mounted upon the ram of said press, a cup expanding ring pressing upon the inner surface of said cup and the outer surface thereof against the cylinder wall, and a fillet ring for supporting the fillet of said cup leather at the junction of the ram and the cylinder walls.

4. A cup leather for hydraulic piston packing comprising, in combination with a ram of a hydraulic press and the cylinder thereof, of a cup leather mounted upon the ram of said press, a cup expanding ring pressing upon the inner surface of said cup and the outer surface against the cylinder wall, and an expandible fillet ring for supporting the fillet of said cup leather at the junction of the ram and the cylinder walls.

5. A cup leather for hydraulic piston packing comprising, in combination with a ram, of a hydraulic press and cylinder thereof, of a cup leather mounted upon said ram, an expandible ring mounted on one surface of the cup leather adapted to press the latter against the cylinder and take up irregularities in wear, and means loosely mounted on said ram pressing against another surface of the cup leather to supplement the action of said expandible ring.

6. A hydraulic press, including, in combination, a cylinder having a ram, an expandible member loosely mounted on said ram and slidably engaging said cylinder, a cup leather having a fillet portion seated on said member, and an adjustably expandible ring adapted to press said cup leather against said cylinder.

7. A hydraulic press, including, in combination, a cylinder having a ram, of an expandible member embodying spaced lugs, an expansible joint between said lugs and means associated with said lugs to limit expansion of said joint, a cup leather operatively held by said expandible member, and means independent of the ram loosely mounted thereon adapted to take up inequalities of said cup leather.

8. A hydraulic press, including, in combination, a cylinder having a ram, of an expandible member embodying spaced lugs, and terminal free overlapping slidable portions between said lugs, means carried by said lugs to limit the movement of said overlapping portions, a cup leather operatively held by said expandible member and means independent of the ram loosely mounted thereon slidably engaging said cylinder adapted to take up the inequalities and wear of said cup leather.

9. In a fluid pressure apparatus comprising a pair of relatively movable parts one having an engagement face, a flexible packing carried by the other part for closing the space between said parts, said packing comprising a portion having pressure engagement with said engagement face, and means yieldable relative to the packing-carrying part and disposed along adjacent portions of said parts between said space and the packing and yieldably pressing against said engagement face, to hold the packing from being forced between said relatively movable parts.

10. In a fluid pressure apparatus comprising a pair of relatively movable parts one having an engagement face, the other having a supporting face transverse to the engagement face, a flexible packing for closing space between said parts comprising a portion engaged with said supporting face, a portion having pressure engagement with said engagement face and a fillet between said portions, and a yieldable fillet ring member disposed along said fillet between the fillet and the adjacent portions of said faces and forced against said adjacent portions by the pressure on the packing and serving to hold the fillet from contact with said adjacent portions or from being forced between said relatively movable parts.

11. In combination with a piston and cylinder, a flexible packing for closing the space therebetween comprising portions disposed substantially at right angles to each other and connected by a filleted portion, and a ring member of ductile material separate from the piston and cylinder for supporting the fillet of said packing.

12. In combination with a piston and cylinder, a flexible packing for closing the space therebetween comprising portions disposed substantially at right angles to each other and connected by a curved portion, and a continuous member of relatively soft metal for supporting the curved portion of said packing on the outer side of the curve and sealing the joint between the piston and cylinder.

13. In combination with a piston and cylinder, a flexible packing comprising portions at angles to each other connected by a portion having an outer curve, and an expansible member for supporting the packing at said outer curve.

14. In a fluid pressure apparatus comprising a pair of relatively movable parts one having a cylindrical engagement face, an annular flexible packing carried by the other part for the closing space between said parts, said packing comprising an annual wall portion disposed in pressure engagement with said engagement face, and a ring-shaped yieldable member disposed adjacent to said wall portion and having a continuous annular face at all times pressing upon the wall portion and longitudinally continuously engaging said wall portion and pressing it into longitudinally continuous engagement with said engagement face.

15. In a piston packing, a flexible packing having a fillet, a continuous expandible ring for supporting the fillet of said packing, and a ring-shaped member disposed adjacent the flexible packing to press the wall thereof laterally.

16. In a piston packing, a flexible packing having a fillet, a continuous ring for supporting the fillet of said packing, and a ring-shaped pressure member disposed adjacent the flexible packing on the side thereof opposite the fillet-supporting ring to press the wall thereof laterally, said last-named ring being split transversely and having a tendency to vary in diameter in order to exert lateral pressure on the packing side wall.

17. In combination with a piston and cylinder, a flexible packing having portions disposed substantially at right angles to each other and connected by a part presenting a fillet, one of said portions being in engagement with one of said members to close the space between it and the other, a continuous expandible ring supporting the fillet of said packing, and means on the other side of the packing from the fillet-supporting ring to press the packing continuously against the member engaged thereby.

Signed at New York in the county of New York and State of New York this 6th day of August A. D. 1928.

HERMAN J. B. SCHARNBERG.